(12) United States Patent
Yoon et al.

(10) Patent No.: US 11,024,851 B2
(45) Date of Patent: Jun. 1, 2021

(54) BINDER COMPOSITION FOR SECONDARY BATTERY, AND ELECTRODE FOR SECONDARY BATTERY AND LITHIUM SECONDARY BATTERY WHICH INCLUDE THE SAME

(71) Applicant: LG CHEM, LTD., Seoul (KR)

(72) Inventors: Ji Hee Yoon, Daejeon (KR); Jung Woo Yoo, Daejeon (KR); Je Young Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/325,500

(22) PCT Filed: Mar. 29, 2018

(86) PCT No.: PCT/KR2018/003746
§ 371 (c)(1),
(2) Date: Feb. 14, 2019

(87) PCT Pub. No.: WO2018/182343
PCT Pub. Date: Oct. 4, 2018

(65) Prior Publication Data
US 2020/0235395 A1    Jul. 23, 2020

(30) Foreign Application Priority Data

Mar. 31, 2017  (KR) .................. 10-2017-0042131
Mar. 28, 2018  (KR) .................. 10-2018-0035834

(51) Int. Cl.
*H01M 4/62*       (2006.01)
*H01M 4/38*       (2006.01)
(Continued)

(52) U.S. Cl.
CPC ............ *H01M 4/622* (2013.01); *C08L 25/10* (2013.01); *C08L 29/04* (2013.01); *C08L 33/08* (2013.01);
(Continued)

(58) Field of Classification Search
CPC ... H01M 4/622; H01M 4/386; H01M 10/0525
See application file for complete search history.

(56) References Cited

U.S. PATENT DOCUMENTS 8,277,976 B2   10/2012   Ryu et al.
8,758,937 B2    6/2014   Ryu et al.
(Continued)

FOREIGN PATENT DOCUMENTS

CN   104704662 A   6/2015
CN   105576258 A   5/2016
(Continued)

OTHER PUBLICATIONS

International Search Report (PCT/ISA/210) issued in PCT/KR2018/003746, dated Jul. 30, 2018.
(Continued)

*Primary Examiner* — Jayne L Mershon
(74) *Attorney, Agent, or Firm* — Birch, Stewart, Kolasch & Birch, LLP

(57) ABSTRACT

A binder composition for a secondary battery which includes a copolymer binder including at least one unit selected from (A) a unit derived from a vinyl-based monomer, (B) a unit derived from a conjugated diene-based monomer or a conjugated diene-based polymer, (C) a unit derived from a (meth)acrylic acid ester-based monomer, and (D) a unit derived from a water-soluble polymer, wherein the copolymer binder has a wet modulus of 0.02 MPa or more, and a negative electrode for a lithium secondary battery and a lithium secondary battery which include the same.

12 Claims, 3 Drawing Sheets

(51) Int. Cl.
  *H01M 10/0525* (2010.01)
  *C08L 33/08* (2006.01)
  *C08L 25/10* (2006.01)
  *C08L 33/26* (2006.01)
  *C08L 29/04* (2006.01)
  *H01M 4/02* (2006.01)

(52) U.S. Cl.
  CPC ............ *C08L 33/26* (2013.01); *H01M 4/386* (2013.01); *H01M 10/0525* (2013.01); *H01M 2004/021* (2013.01); *H01M 2004/027* (2013.01)

(56) References Cited

U.S. PATENT DOCUMENTS

| | | |
|---|---|---|
| 2002/0068783 A1 | 6/2002 | Maeda et al. |
| 2003/0113626 A1 | 6/2003 | Maeda et al. |
| 2006/0257739 A1 | 11/2006 | Ryu et al. |
| 2007/0202403 A1 | 8/2007 | Oh et al. |
| 2012/0315541 A1 | 12/2012 | Sasaki et al. |
| 2012/0330589 A1 | 12/2012 | Ryu et al. |
| 2014/0272574 A1 | 9/2014 | Son et al. |
| 2015/0188141 A1 | 7/2015 | Yamaguchi |
| 2015/0280237 A1 | 10/2015 | Mukai et al. |
| 2016/0126551 A1 | 5/2016 | Sasaki |
| 2018/0108912 A1 | 4/2018 | Kang et al. |

FOREIGN PATENT DOCUMENTS

| | | |
|---|---|---|
| JP | 2008-537841 A | 9/2008 |
| JP | 6032504 B2 | 11/2016 |
| KR | 10-0582518 B1 | 5/2006 |
| KR | 10-0767966 B1 | 10/2007 |
| KR | 10-0790833 B1 | 1/2008 |
| KR | 10-2009-0019630 A | 2/2009 |
| KR | 20090019630 * | 2/2009 |
| KR | 10-2014-0114911 A | 9/2014 |
| KR | 10-2016-0015222 A | 2/2016 |
| KR | 10-2016-0047237 A | 5/2016 |
| WO | WO 2012/026462 A1 | 3/2012 |
| WO | WO 2015/033827 A1 | 3/2015 |
| WO | WO 2016/204530 A1 | 12/2016 |

OTHER PUBLICATIONS

Extended European Search Report, dated Sep. 24, 2019, for European Application No. 18778291.9.
Indian Office Action for Indian Application No. 201917011149, dated Feb. 8, 2021, with an English translation.

* cited by examiner

BINDER COMPOSITION FOR SECONDARY BATTERY, AND ELECTRODE FOR SECONDARY BATTERY AND LITHIUM SECONDARY BATTERY WHICH INCLUDE THE SAME

CROSS-REFERENCE TO RELATED APPLICATIONS

This application claims the benefit of Korean Patent Application Nos. 10-2017-0042131, filed on Mar. 31, 2017, and 10-2018-0035834, filed on Mar. 28, 2018, in the Korean Intellectual Property Office, the disclosure of which is incorporated herein in its entirety by reference.

TECHNICAL FIELD

Technical Field

The present invention relates to a binder composition for a secondary battery, and an electrode for a secondary battery and a lithium secondary battery which include the same, and more particularly, to a binder composition having an appropriate wet modulus, and an electrode for a secondary battery and a lithium secondary battery which include the same.

BACKGROUND ART

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

A slurry is prepared by mixing a positive electrode active material or negative electrode active material and a binder resin component and dispersing the mixture in a solvent, and an electrode of a lithium secondary battery is prepared by coating a surface of an electrode collector with the slurry, drying the coated surface, and then forming a material mixture layer.

A binder is used to secure adhesion or a binding force between the active materials and between the active material and the electrode collector, but an excessive amount of the binder is required to improve the adhesion between the active material and the electrode collector. However, the excessive amount of the binder may reduce capacity and conductivity of the electrode. In contrast, insufficient adhesion causes an electrode exfoliation phenomenon in a process, such as electrode drying and pressing, to become a cause of increasing an electrode failure rate. Also, an electrode having low adhesion may be exfoliated by an external impact, and the electrode exfoliation may become a cause of reduction in electrode output performance by increasing contact resistance between the electrode material and the collector.

Particularly, there is a limitation in that cycle life is reduced because a change in volume of the negative electrode active material due to a reaction with lithium occurs during charge and discharge of the lithium secondary battery and capacity is rapidly reduced as charge and discharge cycles proceed due to the exfoliation of the negative electrode active material from the current collector during continuous charge and discharge or an increase in resistance according to a change in contact interface between the active materials. Also, in a case in which materials, such as silicon, tin, and a silicon-tin alloy, are composited and used to increase discharge capacity, since a larger volume change occurs due to a reaction of silicon or tin with lithium, the limitation becomes more apparent.

Thus, there is a continuous need to develop a binder, which may provide a secondary battery having improved performance by providing better adhesion to address a reduction in electrochemical performance due to the electrode exfoliation, the exfoliation of the active material from the current collector, or the change in the contact interface between the active materials, and an electrode for a secondary battery which is prepared by using the binder.

DISCLOSURE OF THE INVENTION

Technical Problem

An aspect of the present invention provides a binder composition for a secondary battery which may improve life performance of the battery by maintaining high mechanical properties even after electrolyte solution impregnation while providing better adhesion.

Another aspect of the present invention provides an electrode for a secondary battery which includes the binder composition for a secondary battery.

Another aspect of the present invention provides a lithium secondary battery including the electrode for a secondary battery.

Technical Solution

According to an aspect of the present invention, there is provided a binder composition for a secondary battery which includes a copolymer binder including at least one unit selected from the group consisting of (A) a unit derived from a vinyl-based monomer, (B) a unit derived from a conjugated diene-based monomer or a conjugated diene-based polymer, and (C) a unit derived from a (meth)acrylic acid ester-based monomer, and (D) a unit derived from a water-soluble polymer, wherein the copolymer binder has a wet modulus of 0.02 MPa or more.

According to another aspect of the present invention, there is provided an electrode for a lithium secondary battery which includes a silicon-based negative electrode active material and the binder composition for a secondary battery.

According to another aspect of the present invention, there is provided a lithium secondary battery including the electrode for a lithium secondary battery.

Advantageous Effects

Since a binder composition for a secondary battery according to the present invention includes a copolymer binder including a hydrophilic functional group and the copolymer binder has a predetermined value or more of wet modulus, the copolymer binder not only exhibits improved adhesion, but also maintains high mechanical properties even after electrolyte solution impregnation, and thus, life performance of the battery may be improved.

BEST MODE FOR CARRYING OUT THE INVENTION

Figure 1:
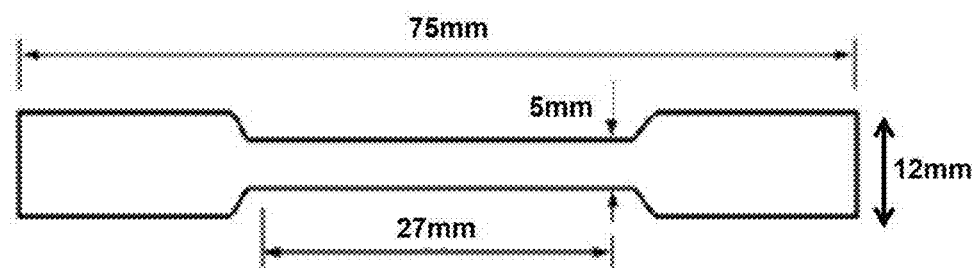
FIG. 1 illustrates design and specification of a specimen used in Experimental Example 1.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A binder composition for a lithium secondary battery according to the present invention includes a copolymer binder which includes at least one unit selected from the group consisting of (A) a unit derived from a vinyl-based monomer, (B) a unit derived from a conjugated diene-based monomer or a conjugated diene-based polymer, and (C) a unit derived from a (meth)acrylic acid ester-based monomer, and (D) a unit derived from a water-soluble polymer, wherein the copolymer binder has a wet modulus of 0.02 MPa or more.

The copolymer binder may have a wet modulus of 0.02 MPa or more, particularly 0.1 MPa or more, and more particularly 0.3 MPa to 0.5 MPa, and, in a case in which the copolymer binder has a wet modulus within the above range, since swelling due to an electrolyte solution may be appropriately suppressed and adequate mechanical properties may be maintained, life characteristics of an electrode and a secondary battery, which include the same, may be improved.

After the copolymer binder is impregnated in a conventional electrolyte solution used in the lithium secondary battery, the wet modulus may be measured by identifying a relationship between tensile stress and tensile strain generated in the copolymer binder through a stress-strain curve obtained by applying a load to the copolymer binder.

Since the wet modulus denotes a modulus of the copolymer binder in a state in which the copolymer binder is impregnated in the electrolyte solution like an actual driving environment of the lithium secondary battery, the wet modulus has a different meaning from high dry modulus in terms of the fact that the wet modulus more directly reflects the modulus of the copolymer binder in the actual driving environment of the lithium secondary battery than the dry modulus.

A wet modulus value of the copolymer binder may be obtained by adjusting an amount of a hydrophilic functional group of the copolymer binder, and, specifically, the copolymer binder may be allowed to have an appropriate wet modulus value by appropriately adjusting an amount of (D) the unit derived from a water-soluble polymer which is included in the copolymer binder.

The copolymer may include 1 part by weight to 70 parts by weight of (A) the unit derived from a vinyl-based monomer, 10 parts by weight to 97 parts by weight of (B) the unit derived from a conjugated diene-based monomer or a conjugated diene-based polymer, 1 part by weight to 30 parts by weight of (C) the unit derived from a (meth)acrylic acid ester-based monomer, and 1 part by weight to 70 parts by weight of (D) the unit derived from a water-soluble polymer based on 100 parts by weight of a total weight.

Also, particularly, the copolymer may include 20 parts by weight to 70 parts by weight of (A) the unit derived from a vinyl-based monomer, 10 parts by weight to 60 parts by weight of (B) the unit derived from a conjugated diene-based monomer or a conjugated diene-based polymer, 1 part by weight to 20 parts by weight of (C) the unit derived from a (meth)acrylic acid ester-based monomer, and 1 part by weight to 60 parts by weight of (D) the unit derived from a water-soluble polymer based on 100 parts by weight of the total weight.

Furthermore, more particularly, the copolymer may include 30 parts by weight to 60 parts by weight of (A) the unit derived from a vinyl-based monomer, 15 parts by weight to 30 parts by weight of (B) the unit derived from a conjugated diene-based monomer or a conjugated diene-based polymer, 4 parts by weight to 8 parts by weight of (C) the unit derived from a (meth)acrylic acid ester-based monomer, and 2 parts by weight to 50 parts by weight of (D) the unit derived from a water-soluble polymer based on 100 parts by weight of the total weight.

In a case in which the copolymer includes each of (A) the unit derived from a vinyl-based monomer, (B) the unit derived from a conjugated diene-based monomer or a conjugated diene-based polymer, and (C) the unit derived from a (meth)acrylic acid ester-based monomer within the above range, the copolymer binder may exhibit excellent adhesion and modulus.

Also, in a case in which the copolymer includes (D) the unit derived from a water-soluble polymer within the above range, the copolymer binder may have an excellent wet modulus value.

The copolymer binder is in the form of a particle, and may have an average particle diameter ($D_{50}$) of 100 nm to 1 μm, for example, 300 nm to 500 nm.

In a case in which the copolymer binder has the above average particle diameter ($D_{50}$), appropriate adhesion may be obtained, an electrolyte solution swelling phenomenon may be insignificant, and appropriate elasticity may be obtained so that the copolymer binder may accommodate changes in thickness of the electrode and may reduce a gas generation phenomenon.

In the present invention, the average particle diameter ($D_{50}$) may be defined as a particle diameter at 50% in the cumulative particle diameter distribution. The average particle diameter is not particularly limited, but, for example, the average particle diameter may be measured by using a laser diffraction method or a scanning electron microscope (SEM) image. The laser diffraction method may generally measure a particle diameter ranging from a submicron level to a few mm, and may obtain highly repeatable and high resolution results.

The units included in the copolymer binder are as follows.

In (A) the unit derived from a vinyl-based monomer, the vinyl-based monomer may include at least one selected from the group consisting of styrene, α-methylstyrene, β-methylstyrene, p-t-butylstyrene, and divinylbenzene.

In (B) the unit derived from a conjugated diene-based monomer or a conjugated diene-based polymer, the conjugated diene-based monomer may include 1,3-butadiene, isoprene, chloroprene, or piperylene, and the conjugated diene-based polymer may include at least one selected from the group consisting of a polymer of two or more monomers selected from the group consisting of 1,3-butadiene, isoprene, chloroprene, and piperylene, a styrene-butadiene copolymer, an acrylonitrile-butadiene copolymer, a styrene-isoprene copolymer, an acrylate-butadiene rubber, an acrylonitrile-butadiene-styrene rubber, an ethylene-propylene-diene-based polymer, and a partially hydrogenated, epoxidized, or brominated form thereof.

(C) the (meth)acrylic acid ester-based monomer may include at least one selected from the group consisting of methyl acrylate, ethyl acrylate, propyl acrylate, isopropyl acrylate, n-butyl acrylate, isobutyl acrylate, n-amyl acrylate, isoamyl acrylate, n-ethylhexyl acrylate, 2-ethylhexyl acrylate, 2-hydroxyethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethylhexyl methacrylate, 2-ethylhexyl methacrylate, hydroxyethyl methacrylate, hydroxypropyl methacrylate, methacryloxyethyl ethylene urea, β-carboxyethyl acrylate, aliphatic monoacrylate, dipropylene diacrylate, ditrimethylolpropane tetraacrylate, hydroxyethyl acrylate, dipentaerythritol hexaacrylate, pentaerythritol triacrylate, pentaerythritol tetraacrylate, lauryl acrylate, seryl acrylate, stearyl acrylate, lauryl methacrylate, cetyl methacrylate, and stearyl methacrylate.

In (D) the unit derived from a water-soluble polymer, the water-soluble polymer may be a copolymer including at least one unit selected from the group consisting of a unit derived from a (meth)acrylic acid ester-based monomer, a unit derived from a (meth)acrylamide-based monomer, and a unit derived from an unsaturated carboxylic acid-based monomer and a vinyl acetate monomer, and, a preparation method thereof is not particularly limited, but the water-soluble polymer, for example, may be prepared according to a suspension polymerization method, an emulsion polymerization method, or a seed polymerization method.

The (meth)acrylic acid ester-based monomer may include at least one selected from the group consisting of methyl acrylate, ethyl acrylate, propyl acrylate, isopropyl acrylate, n-butyl acrylate, isobutyl acrylate, n-amyl acrylate, isoamyl acrylate, n-ethylhexyl acrylate, 2-ethylhexyl acrylate, 2-hydroxyethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethylhexyl methacrylate, 2-ethylhexyl methacrylate, hydroxyethyl methacrylate, hydroxypropyl methacrylate, methacryloxyethyl ethylene urea, β-carboxyethyl acrylate, aliphatic monoacrylate, dipropylene diacrylate, ditrimethylolpropane tetraacrylate, hydroxyethyl acrylate, dipentaerythritol hexaacrylate, pentaerythritol triacrylate, pentaerythritol tetraacrylate, lauryl acrylate, seryl acrylate, stearyl acrylate, lauryl methacrylate, cetyl methacrylate, and stearyl methacrylate.

The (meth)acrylamide-based monomer may include at least one selected from the group consisting of acrylamide, n-methylol acrylamide, n-butoxymethyl acrylamide, methacrylamide, n-methylol methacrylamide, and n-butoxymethyl methacrylamide.

The unsaturated carboxylic acid-based monomer may include at least one selected from the group consisting of maleic acid, fumaric acid, methacrylic acid, acrylic acid, glutaric acid, itaconic acid, tetrahydrophthalic acid, crotonic acid, isocrotonic acid, and nadic acid.

The water-soluble polymer may particularly include at least one selected from the group consisting of polyvinyl alcohol (PVA), polyacrylic acid (PAA), and polyacrylamide (PAM), and may be more particularly polyacrylic acid (PAA).

A preparation method of the copolymer binder is not particularly limited, but the copolymer binder, for example, may be prepared according to a suspension polymerization method, an emulsion polymerization method, or a seed polymerization method, and may be specifically prepared by the emulsion polymerization method.

The copolymer binder may include one or more other components, such as a polymerization initiator, a cross-linking agent, a buffer, a chain transfer agent, and an emulsifier, if necessary.

In a method of preparing the binder composition for a secondary battery according to an embodiment of the present invention, if a case, in which the copolymer binder is prepared by an emulsion polymerization method, is described as an example, other components, such as a polymerization initiator, a buffer, a chain transfer agent, and an emulsifier, may be added during the polymerization while the copolymer binder is prepared by the emulsion polymerization method using the vinyl-based monomer, the conjugated diene-based monomer or conjugated diene-based polymer, the water-soluble polymer, and a cross-linking agent. A particle diameter of the copolymer binder may be adjusted according to an amount of the emulsifier. Specifically, in a case in which the amount of the emulsifier is increased, the average diameter of the particle may be decreased, and, in a case in which the amount of the emulsifier is reduced, the average diameter of the particle may be increased.

Polymerization temperature and polymerization time may be appropriately determined depending on a polymerization method or a type of the polymerization initiator. For example, the polymerization temperature may be in a range of 50° C. to 300° C., and the polymerization time may be in a range of 1 hour to 20 hours, but the polymerization temperature and the polymerization time are not particularly limited.

Inorganic or organic peroxide may be used as the polymerization initiator, and, for example, the polymerization initiator may include a water-soluble initiator including potassium persulfate, sodium persulfate, and ammonium persulfate, or an oil-soluble initiator including cumene hydroperoxide and benzoyl peroxide. An activator may be used together to promote an initiation reaction of the polymerization initiator, and the activator may include at least one selected from the group consisting of sodium formaldehyde sulfoxylate, sodium ethylenediamine tetraacetate, ferrous sulfate, and dextrose.

The cross-linking agent may be used to promote cross-linking of the binder and, for example, may include amines, such as diethylenetriamine, triethylenetetramine, diethylaminopropylamine, xylenediamine, and isophoronediamine, acid anhydrides, such as dodecyl succinic anhydride and phthalic anhydride, a polyamide resin, a polysulfide resin, a phenol resin, ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylolpropane trimethacrylate, trimethylol methane triacrylate, and glycidyl methacrylate. A grafting agent may be used together, and, for example, the grafting agent may include aryl methacrylate (AMA), triallyl isocyanurate (TRIC), triarylamine (TAA), or diarylamine (DAA).

The buffer, for example, may include $NaHCO_3$, NaOH, or $NH_4OH$.

The chain transfer agent, for example, may include mercaptans, terpines, such as terpinolene, dipentene, and t-terpinene, or halogenated hydrocarbons such as chloroform and carbon tetrachloride.

The emulsifier may be an anionic emulsifier, a nonionic emulsifier, or a mixture thereof, and, in a case in which the nonionic emulsifier is used with the anionic emulsifier, additional stabilization in the form of a colloid through van der Waals force of the polymer particles may be provided in addition to electrostatic stabilization of the anionic emulsifier.

The anionic emulsifier, for example, may include a phosphate-based, carboxylate-based, sulfate-based, succinate-based, sulfosuccinate-based, sulfonate-based, or disulfonate-based emulsifier, and, although the anionic emulsifier is not particularly limited, the anionic emulsifier may specifically include sodium alkyl sulfate, sodium polyoxyethylene sulfate, sodium lauryl ether sulfate, sodium polyoxyethylene lauryl ether sulfate, sodium lauryl sulfate, sodium alkyl sulfonate, sodium alkyl ether sulfonate, sodium alkylbenzene sulfonate, sodium linear alkylbenzene sulfonate, sodium alpha-olefin sulfonate, sodium alcohol polyoxyethylene ether sulfonate, sodium dioctylsulfosuccinate, sodium perfluorooctanesulfonate, sodium perfluorobutanesulfonate, alkyldiphenyloxide disulfonate, sodium dioctyl sulfosuccinate, sodium alkyl-aryl phosphate, sodium alkyl ether phosphate, or sodium lauroyl sarcosinate.

The nonionic emulsifier, for example, may include an ester type, ether type, or ester-ether type emulsifier, and, although the nonionic emulsifier is not particularly limited, the nonionic emulsifier may specifically include polyoxyethylene glycol, polyoxyethylene glycol methyl ether, polyoxyethylene monoallyl ether, polyoxyethylene bisphenol-A ether, polypropylene glycol, polyoxyethylene neopentyl ether, polyoxyethylene cetyl ether, polyoxyethylene lauryl ether, polyoxyethylene oleyl ether, polyoxyethylene stearyl ether, polyoxyethylene decyl ether, and polyoxyethylene octyl ether.

The binder composition for a secondary battery may be used as a binder in the preparation of an electrode for a lithium secondary battery, and, particularly, in a case in which a silicon-based negative electrode active material is used as a negative electrode active material, the binder composition may be usefully used.

Thus, the present invention provides a negative electrode for a lithium secondary battery which includes a silicon-based negative electrode active material and the binder composition for a secondary battery.

The silicon-based negative electrode active material, for example, may include at least one selected from the group consisting of silicon (Si), silicon oxide particles ($SiO_x$, $0<x\le2$), an Si-metal alloy, and an alloy of Si and silicon oxide particles ($SiO_x$, $0<x\le2$), and the silicon oxide particles ($SiO_x$, $0<x\le2$) may be a composite composed of crystalline $SiO_2$ and amorphous Si. Also, in addition to the silicon-based negative electrode active material, a carbon material capable of intercalating and deintercalating lithium ions, lithium metal, or tin may be typically used as the negative electrode active material. Preferably, the carbon material may be used, wherein both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

In the negative electrode for a lithium secondary battery according to an embodiment of the present invention, the negative electrode for a lithium secondary battery may further include a carbon-based negative electrode active material, and, in this case, the silicon-based negative electrode active material may be included in an amount of 1 wt % to 30 wt %, for example, 5 wt % to 10 wt % in the total negative electrode active material. The carbon-based negative electrode active material may specifically include natural graphite, artificial graphite, or a mixture thereof.

In a case in which the negative electrode for a lithium secondary battery includes the silicon-based negative electrode active material, when the binder for a secondary battery used in the formation of a negative electrode active material layer of the electrode has a wet modulus of 0.02 MPa or more, particularly 0.1 MPa or more, and more particularly 0.3 MPa to 0.5 MPa, since the swelling due to the electrolyte solution may be appropriately suppressed and adequate mechanical properties may be maintained, the life characteristics of the electrode and secondary battery, which include the same, may be improved.

The lithium secondary battery may include the negative electrode, a positive electrode, and a separator disposed between the negative electrode and the positive electrode.

The negative electrode may be prepared by a typical method known in the art, and, for example, the negative electrode active material, the above-described binder, and additives, such as a conductive agent, are mixed and stirred to prepare a negative electrode active material slurry, and a negative electrode collector may then be coated with the slurry, dried, and pressed to prepare the negative electrode.

An organic solvent, such as N-methylpyrrolidone (NMP), dimethylformamide (DMF), acetone, and dimethylacetamide, or water may be used as a solvent used for forming the negative electrode. These solvents may be used alone or in a mixture of two or more thereof. An amount of the solvent used may be sufficient if the solvent may dissolve and disperse the negative electrode active material, the binder, and the conductive agent in consideration of a coating thickness of the slurry and manufacturing yield.

The binder composition for a secondary battery may be included in an amount of 10 wt % or less, particularly 0.1 wt % to 10 wt %, and more particularly 0.5 wt % to 4 wt % based on a total weight of the slurry for a negative electrode active material. When the amount of the binder is less than 0.1 wt %, it is not desirable because an effect obtained by using the binder is insignificant, and, when the amount of the binder is greater than 10 wt %, it is not desirable because capacity per volume may be reduced due to a relative decrease in the amount of the active material caused by the increase in the amount of the binder.

Any conductive agent may be used without particular limitation so long as it has conductivity without causing adverse chemical changes in the battery, and, examples of the conductive agent may be a conductive material such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives. The conductive agent may be used in an amount of 1 wt % to 9 wt % based on the total weight of the slurry for a negative electrode active material.

A negative electrode collector used in the negative electrode according to an embodiment of the present invention may have a thickness of 3 μm to 500 μm. The negative electrode collector is not particularly limited as long as it has conductivity without causing adverse chemical changes in the battery, and, for example, copper, gold, stainless steel, aluminum, nickel, titanium, fired carbon, copper or stainless steel that is surface-treated with one of carbon, nickel, titanium, silver, or the like, and an aluminum-cadmium alloy may be used. Also, microscopic irregularities may be formed on the surface of the collector to improve the adhesion of the negative electrode active material, and the negative electrode collector may be used in various shapes such as a film, a sheet, a foil, a net, a porous body, a foam body, a non-woven fabric body, and the like.

A viscosity modifier and/or a filler may be included in the active material slurry, if necessary.

The viscosity modifier may be carboxymethyl cellulose, or polyacrylic acid, and viscosity of the active material slurry may be adjusted so that the preparation of the active material slurry and the coating process of the electrode collector are facilitated by the addition of the viscosity modifier.

The filler is an auxiliary component for suppressing the expansion of the electrode, wherein it is not particularly limited as long as it is a fibrous material that does not cause chemical changes in the battery, and, for example, the filler may include an olefin-based polymer, such as polyethylene and polypropylene, and a fibrous material such as glass fibers and carbon fibers.

The positive electrode may be prepared by a typical method known in the art. For example, a solvent, the above-described binder, a conductive agent, and a dispersant are mixed with a positive electrode active material and stirred to prepare a slurry, a metal current collector is then coated with the slurry and pressed, and the positive electrode may then be prepared by drying the coated metal current collector.

The metal current collector is a metal with high conductivity, wherein the metal current collector is not particularly limited so long as it, as a metal to which the slurry of the positive electrode active material may be easily adhered, has high conductivity without causing adverse chemical changes in the battery in a voltage range of the battery, and, for example, stainless steel, aluminum, nickel, titanium, fired carbon, or aluminum or stainless steel that is surface-treated with one of carbon, nickel, titanium, silver, or the like may be used. Also, the metal current collector may have a microscopic uneven surface to improve the adhesion of the positive electrode active material. The current collector may be used in various shapes, such as a film, a sheet, a foil, a net, a porous body, a foam body, a non-woven fabric body, and the like, and may have a thickness of 3 μm to 500 μm.

Examples of the positive electrode active material may be lithium cobalt oxide ($LiCoO_2$); lithium nickel oxide ($LiNiO_2$); $Li[Ni_aCo_bMn_cM^1_d]O_2$ (where $M^1$ is at least one element selected from the group consisting of aluminum (Al), gallium (Ga), and indium (In), $0.3 \le a < 0.1$, $0 \ge b \ge 0.5$, $0 \le c \le 0.5$, $0 \le d \le 0.1$, and $a+b+c+d=1$); a layered compound, such as $Li(Li_eM^2_{f-e-f}M^3_f)O_{2-g}A_g$ (where $0 \le e \le 0.2$, $0.6 \le f \le 1$, $0 \le f' \le 0.2$, $0 \le g \le 0.2$, $M^2$ includes manganese (Mn) and at least one selected from the group consisting of nickel (Ni), cobalt (Co), iron (Fe), chromium (Cr), vanadium (V), copper (Cu), zinc (Zn), and titanium (Ti), $M^3$ is at least one selected from the group consisting of Al, magnesium (Mg), and boron (B), and A is at least one selected from the group consisting of phosphorous (P), fluorine (F), sulfur (S), and nitrogen (N)), or a compound substituted with at least one transition metal; lithium manganese oxides such as $Li_{1+h}Mn_{2-h}O_4$ (where $0 \le h \le 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; Ni-site type lithium nickel oxide represented by the chemical formula $LiNi_{1-i}M^4_iO_2$ (where $M^4$=Co, Mn, Al, Cu, Fe, Mg, B, or Ga, and $0.01 \le i \le 0.3$); lithium manganese composite oxide represented by the chemical formula $LiMn_{2-j}M^5_jO_2$ (where $M^5$=Co, Ni, Fe, Cr, Zn, or Ta, and $0.01 \le j \le 0.1$) or $Li_2Mn_3M^6O_8$ (where $M^6$=Fe, Co, Ni, Cu, or Zn); $LiMn_2O_4$ having a part of lithium (Li) being substituted with alkaline earth metal ions; a disulfide compound; $LiFe_3O_4$, or $Fe_2(MoO_4)_3$, but the positive electrode active material is not limited thereto.

An organic solvent, such as N-methylpyrrolidone (NMP), dimethylformamide (DMF), acetone, and dimethylacetamide, or water may be used as the solvent used for forming the positive electrode. These solvents may be used alone or in a mixture of two or more thereof. An amount of the solvent used may be sufficient if the solvent may dissolve and disperse the positive electrode active material, the binder, and the conductive agent in consideration of a coating thickness of the slurry and manufacturing yield.

Any conductive agent may be used without particular limitation so long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. The conductive agent may be used in an amount of 1 wt % to 20 wt % based on a total weight of the positive electrode slurry.

An aqueous dispersant or an organic dispersant, such as N-methyl-2-pyrrolidone, may be used as the dispersant.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the separator is not limited thereto.

A lithium salt, which may be included as an electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In the electrolyte solution used in the present invention, any organic solvent typically used in an electrolyte solution for a secondary battery may be used without limitation as an organic solvent included in the electrolyte solution and, typically, any one selected from the group consisting of propylene carbonate (PC), ethylene carbonate (EC), diethyl carbonate (DEC), dimethyl carbonate (DCM), ethylmethyl carbonate (EMC), methylpropyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran, or a mixture of two or more thereof may be used. Specifically, ethylene carbonate and propylene carbonate, cyclic carbonates among the carbonate-based organic solvents, well dissociate the lithium salt in the electrolyte due to high permittivities as high-viscosity organic solvents, and thus, the cyclic carbonate may be preferably used. Since an electrolyte solution having high electrical conductivity may be prepared when the cyclic carbonate is mixed with low viscosity, low permittivity linear carbonate, such as dimethyl carbonate and diethyl carbonate, in an appropriate ratio, the cyclic carbonate may be more preferably used.

Selectively, the electrolyte solution stored according to the present invention may further include an additive, such as an overcharge inhibitor, that is included in a typical electrolyte solution.

A shape of the lithium secondary battery is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

MODE FOR CARRYING OUT THE INVENTION

Examples

Hereinafter, the present invention will be described in detail, according to examples and experimental examples, but the present invention is not limited to these examples and experimental examples. The invention may be embodied in many different forms and should not be construed as being limited to the embodiments set forth herein. Rather, these example embodiments are provided so that this description will be thorough and complete, and will fully convey the scope of the present invention to those skilled in the art.

Preparation of Copolymer Binder

Example 1

Potassium persulfate, as a polymerization initiator, and a small amount of sodium lauryl sulfate, as an emulsifier, as well as 60 g of styrene, 30 g of 1,3-butadiene, 8 g of butyl acrylate, and 2 g of polyacrylic acid were added to distilled water and reacted while being maintained at 70° C. for 5 hours to obtain a copolymer binder having an average particle diameter ($D_{50}$) of 200 nm.

Example 2

A copolymer binder having an average particle diameter ($D_{50}$) of 350 nm was obtained in the same manner as in Example 1 except that 42 g of polyacrylic acid was used in Example 1.

Example 3

A copolymer binder having an average particle diameter ($D_{50}$) of 450 nm was obtained in the same manner as in Example 1 except that 98 g of polyacrylic acid was used in Example 1.

Comparative Example 1

Potassium persulfate, as a polymerization initiator, and a small amount of sodium lauryl sulfate, as an emulsifier, as well as 40 g of styrene, 40 g of 1,3-butadiene, and 20 g of butyl acrylate were added to distilled water and reacted while being maintained at 70° C. for 5 hours to obtain a copolymer binder having an average particle diameter ($D_{50}$) of 200 nm.

Comparative Example 2

A copolymer binder having an average particle diameter ($D_{50}$) of 200 nm was obtained in the same manner as in Comparative Example 1 except that amounts of 1,3-butadiene and butyl acrylate were changed to 50 g and 10 g, respectively.

Preparation of Negative Electrode and Lithium Secondary Battery

Example 4

<Preparation of Negative Electrode>

A mixed negative electrode active material, in which artificial graphite:natural graphite:silicon-based negative electrode active material (SiO) were mixed in a weight ratio of 84.5:10.5:5, a thickener (carboxymethyl cellulose), carbon black as a conductive agent, and the binder prepared in Example 2 were mixed in a weight ratio of 98:1:1:2 using a TK mixer to prepare a negative electrode slurry. A 20 μm thick copper foil was coated with the negative electrode slurry to a thickness of 120 μm, dried at 100° C. for 12 hours in a vacuum oven, and then rolled to an appropriate thickness to prepare a negative electrode.

<Preparation of Positive Electrode>

After 96 g of $LiCoO_2$ as a positive electrode active material, 2 g of acetylene black, and 2 g of polyvinylidene fluoride (PVdF), as a binder, were added to N-methyl-2-pyrrolidone (NMP), as a solvent, to prepare a slurry for a positive electrode, an aluminum (Al) thin film was coated with the slurry for a positive electrode, dried, and then roll-pressed to prepare a positive electrode.

<Preparation of Lithium Secondary Battery>

A mono-cell was prepared by punching the above-prepared negative electrode so that a surface area thereof was 13.33 cm² and punching the above-prepared positive electrode so that a surface area thereof was 12.60 cm². Taps were respectively attached to upper portions of the positive electrode and the negative electrode, a separator formed of a polyolefin microporous membrane was disposed between the negative electrode and the positive electrode, the resultant product was placed in an aluminum pouch, and 500 mg of an electrolyte solution was then injected into the pouch. The electrolyte solution was prepared by dissolving a $LiPF_6$ electrolyte at a concentration of 1 M using a mixed solvent of ethylene carbonate (EC):diethyl carbonate (DEC):propylene carbonate (PC) (volume ratio of 4:3:3).

Thereafter, after the pouch was sealed using a vacuum packaging machine and maintained for 12 hours at room temperature, the pouch was subjected to a constant voltage charging process in which constant-current charging was performed at a rate of about 0.05 C and a voltage was maintained until the current was reduced to about ⅙ of the initial value. In this case, since gas is generated in the cell, degassing and resealing processes were performed to complete a lithium secondary battery.

Example 5

A negative electrode, a positive electrode, and a lithium secondary battery were prepared in the same manner as in Example 4 except that the copolymer binder of Example 1 was used as a binder and a mixed negative electrode active material, in which artificial graphite:natural graphite:silicon-based negative electrode active material were mixed in a weight ratio of 80:10:10, was used during the preparation of the negative electrode in Example 4.

Examples 6 and 7

Negative electrodes, positive electrodes, and lithium secondary batteries were respectively prepared in the same manner as in Example 4 except that a mixed negative electrode active material, in which artificial graphite:natural graphite:silicon-based negative electrode active material were mixed in a weight ratio of 80:10:10, was used and the copolymer binders of Examples 2 and 3 were respectively used during the preparation of the negative electrode in Example 4.

Example 8

A negative electrode, a positive electrode, and a lithium secondary battery were prepared in the same manner as in Example 4 except that a mixed negative electrode active material, in which artificial graphite:silicon-based negative electrode active material were mixed in a weight ratio of 70:30, was used and the copolymer binder of Example 3 was used during the preparation of the negative electrode in Example 4.

Comparative Examples 3 and 4

Negative electrodes, positive electrodes, and lithium secondary batteries were respectively prepared in the same manner as in Example 4 except that the copolymer binders prepared in Comparative Examples 1 and 2 were respectively used as a binder during the preparation of the negative electrode in Example 4.

Comparative Example 5

A negative electrode, a positive electrode, and a lithium secondary battery were prepared in the same manner as in Example 4 except that a mixed negative electrode active material, in which artificial graphite:silicon-based negative electrode active material were mixed in a weight ratio of 70:30, was used and the copolymer binder prepared in Comparative Example 1 was used during the preparation of the negative electrode in Example 4.

EXPERIMENTAL EXAMPLES

Experimental Example 1: Measurement of Modulus and Electrolyte Solution Swelling Dry modulus and wet modulus of each of the copolymer binders prepared in Examples 1 to 3 and Comparative Examples 1 and 2 were measured by a relationship between tensile stress and tensile strain generated in each binder through a stress-strain curve obtained by applying a load to each binder using a universal testing machine (UTM).

Specifically, after each binder dispersed in the solvent, which was prepared in Examples 1 to 3 and Comparative Examples 1 and 2, was coated to a predetermined thickness on a dish and dried, each binder film was cut into a size as shown in the following FIG. 1 to prepare specimens and experiments were performed.

The dry modulus was measured using the specimen, and the wet modulus was measured using a specimen in which the specimen was impregnated in a mixed solvent of EC/DEC/PC (volume ratio of 3:2:5) for 48 hours and then dried at room temperature for 5 minutes. In this case, lengths of the specimen and the specimen after the impregnation were compared, and a degree of increase in length after the impregnation was calculated to evaluate a degree of electrolyte solution swelling. The results thereof are presented in the following Table 1.

Experimental Example 2: Measurement of Capacity Retention

<0.5 C Capacity Retention Measurement>

A charge and discharge test, in which a charge and discharge current density was 0.5 C, a charge end voltage was 4.2 V (Li/Li$^+$), and a discharge end voltage was 3 V (Li/Li$^+$), was performed 30 times on the lithium secondary batteries prepared in Example 4 and Comparative Examples 3 and 4.

All charging were performed under constant current/constant voltage conditions, and an end current of constant-voltage charge was set to 0.05 C. After completing a total of 30 test cycles, discharge capacity measured in each cycle when initial discharge capacity was set to 100% was illustrated in FIG. 2.

<1 C Capacity Retention Measurement>

A charge and discharge test, in which a charge and discharge current density was 1 C, a charge end voltage was 4.2 V (Li/Li$^+$), and a discharge end voltage was 3 V (Li/Li$^+$), was performed 130 times on the lithium secondary batteries prepared in Examples 5 to 7.

All charging were performed under constant current/constant voltage conditions, and an end current of constant-voltage charge was set to 0.05 C. After completing a total of 130 test cycles, discharge capacity measured in each cycle when initial discharge capacity was set to 100% was illustrated in FIG. 3.

<0.33 C Capacity Retention Measurement>

A charge and discharge test, in which a charge and discharge current density was 0.33 C, a charge end voltage was 4.2 V (Li/Li$^+$), and a discharge end voltage was 3 V (Li/Li$^+$), was performed 200 times on the lithium secondary batteries prepared in Example 8 and Comparative Example 5.

All charging were performed under constant current/constant voltage conditions, and an end current of constant-voltage charge was set to 0.05 C. After completing a total of 200 test cycles, discharge capacity measured in each cycle when initial discharge capacity was set to 100% was illustrated in FIG. 4.

TABLE 1

|  | Dry modulus [MPa] | Wet modulus [MPa] | Electrolyte solution swelling (%) |
|---|---|---|---|
| Example 1 | 0.417 | 0.026 | 38 |
| Example 2 | 0.132 | 0.105 | 18 |
| Example 3 | 1.360 | 0.392 | 9 |
| Comparative Example 1 | 0.077 | Not measurable | 120 |
| Comparative Example 2 | 0.051 | 0.011 | 45 |

Figure 2:
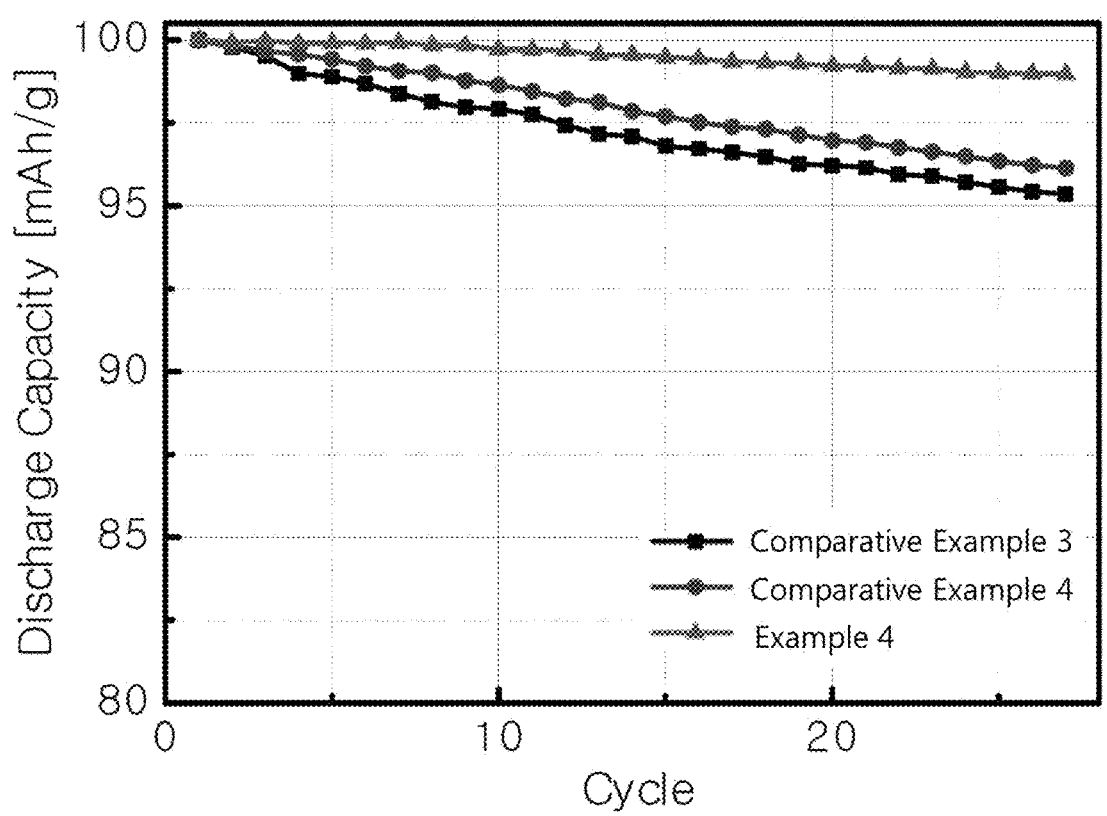
FIG. 2 is a graph illustrating results of measuring a change in discharge capacity of lithium secondary batteries prepared in Example 4 and Comparative Examples 3 and 4 up to 30 cycles at a charge and discharge current density of 0.5 C.
Figure 3:
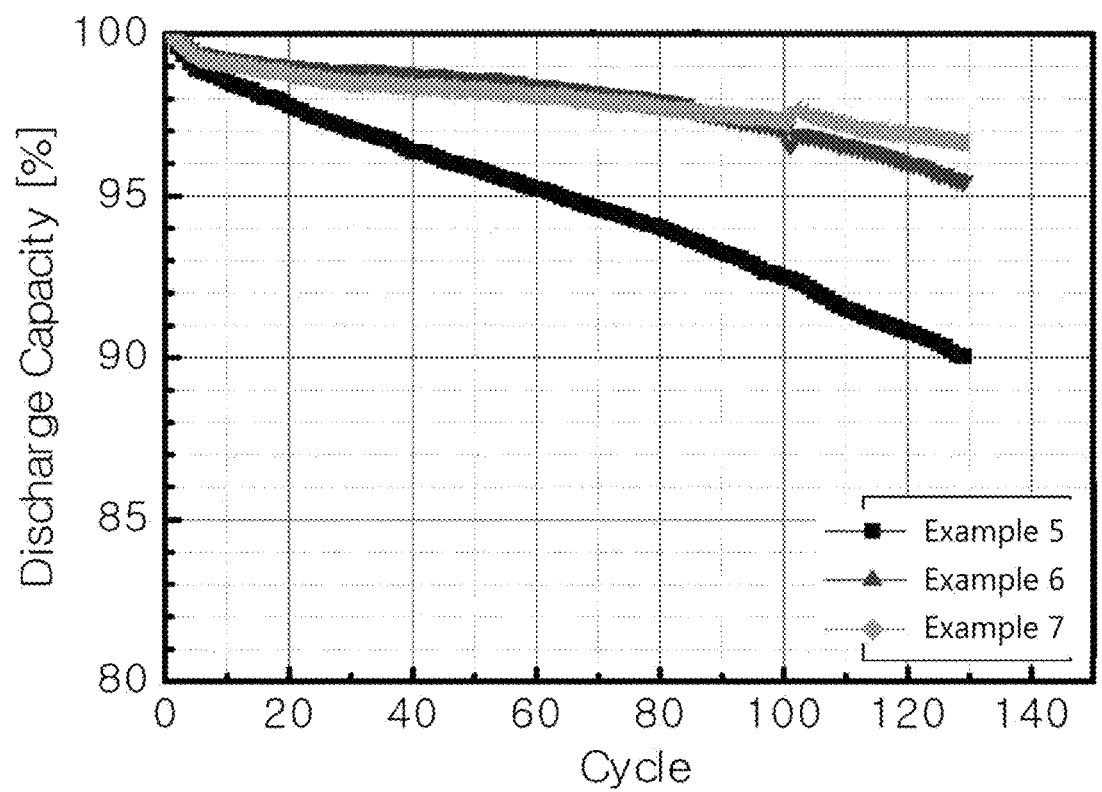
FIG. 3 is a graph illustrating results of measuring a change in discharge capacity of lithium secondary batteries prepared in Examples 5 to 7 up to 130 cycles at a charge and discharge current density of 1 C.

Referring to Table 1 and FIG. 2, with respect to the copolymer binders of Comparative Examples 1 and 2 having a low wet modulus, it may be confirmed that the copolymer binders themselves were greatly swollen by the electrolyte solution in comparison to the copolymer binder of Example 2 having a high wet modulus. Also, it may be confirmed that the negative electrodes and the secondary batteries of Comparative Examples 3 and 4 prepared by using the copolymer binders of Comparative Examples 1 and 2 had poorer capacity retention than the negative electrode and the secondary battery of Example 4 prepared by using the copolymer binder of Example 2. The capacity retention of the secondary battery according to the wet modulus of the copolymer binder used may be confirmed from FIG. 3. Referring to FIG. 3, it may be confirmed that the higher the wet modulus of the copolymer binder was, the better the capacity retention of the negative electrode and secondary battery prepared by using the same was. Particularly, it may be confirmed that good capacity retention may be obtained when the wet modulus was 0.1 or more, and the best capacity retention may be obtained when the wet modulus was 0.3 or more.

Figure 4:
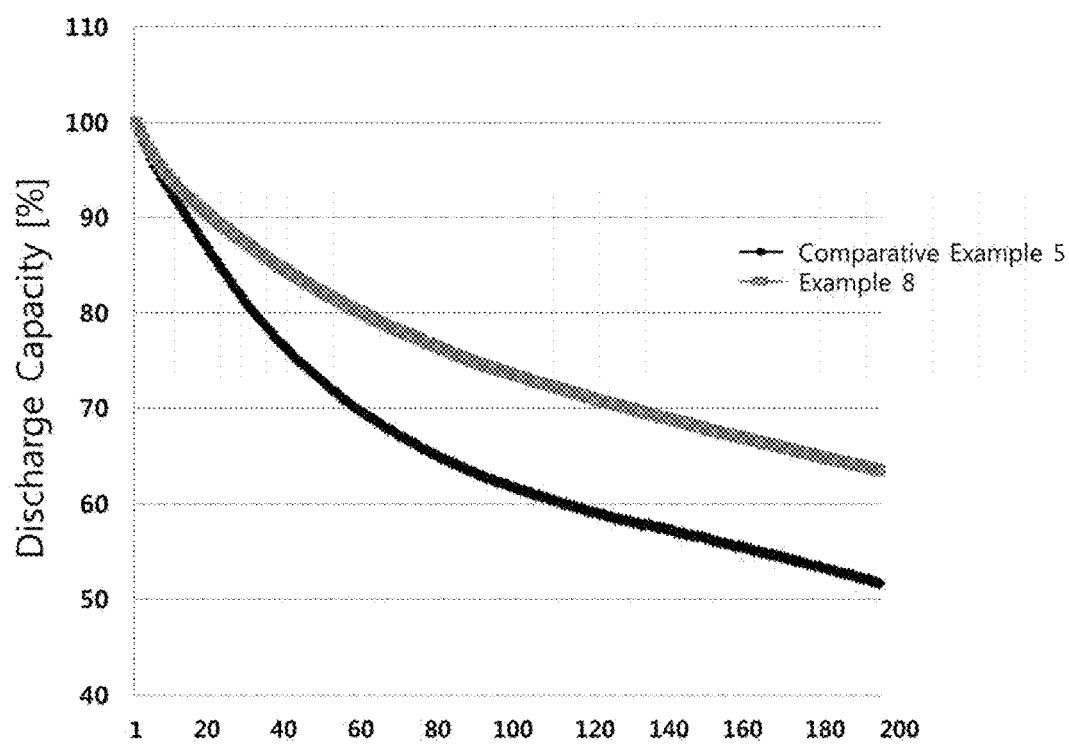
FIG. 4 is a graph illustrating results of measuring a change in discharge capacity of lithium secondary batteries prepared in Example 8 and Comparative Example 5 up to 200 cycles at a charge and discharge current density of 0.33 C.

Also, FIG. 4 illustrates experimental results for comparing differences in effects depending on the type of the copolymer binder when the negative electrode was prepared by using the negative electrode active material in which the artificial graphite and the silicon-based negative electrode active material were mixed in a weight ratio of 70:30. Referring to FIG. 4, it may be confirmed that the negative electrode and secondary battery of Example 8 including the copolymer binder of Example 3 exhibited better capacity retention than the negative electrode and secondary battery of Comparative Example 5 including the copolymer binder of Comparative Example 1. Thus, in a case in which the copolymer binder of the present invention having a wet modulus of 0.02 MPa or more was used in the negative electrode including the silicon-based negative electrode active material having a large volume change due to charge and discharge, it may be confirmed that, since the copolymer binder exhibited improved adhesion and maintained high mechanical properties, life performance of the secondary battery may be improved.

The invention claimed is:

1. A binder composition for a secondary battery, comprising:
   a copolymer binder comprising (A) a unit derived from a vinyl-based monomer, (B) a unit derived from a conjugated diene-based monomer or a conjugated diene-based polymer, (C) a unit derived from a (meth)acrylic acid ester-based monomer, and (D) a unit derived from a water-soluble polymer,
   wherein the copolymer binder has a wet modulus of 0.02 MPa or more, and
   wherein the copolymer binder comprises:
      30 parts by weight to 60 parts by weight of (A) the unit derived from a vinyl-based monomer,
      15 parts by weight to 30 parts by weight of (B) the unit derived from a conjugated diene-based monomer or a conjugated diene-based polymer,
      4 parts by weight to 8 parts by weight of (C) the unit derived from a (meth)acrylic acid ester-based monomer, and
      2 parts by weight to 50 parts by weight of (D) the unit derived from a water-soluble polymer,
      wherein said parts by weight are based on 100 parts by weight of the total weight of the copolymer binder.

2. The binder composition for a secondary battery of claim 1, wherein the copolymer binder is in a form of a particle and has an average particle diameter ($D_{50}$) of 100 nm to 1 μm.

3. The binder composition for a secondary battery of claim 1, wherein the vinyl-based monomer of (A) comprises at least one selected from the group consisting of styrene, α-methylstyrene, β-methylstyrene, p-t-butylstyrene, and divinylbenzene.

4. The binder composition for a secondary battery of claim 1, wherein the conjugated diene-based monomer of (B) comprises 1,3-butadiene, isoprene, chloroprene, or piperylene, and
   the conjugated diene-based polymer of (B) comprises at least one selected from the group consisting of a polymer of two or more monomers selected from the group consisting of 1,3-butadiene, isoprene, chloroprene, and piperylene, a styrene-butadiene copolymer, an acrylonitrile-butadiene copolymer, a styrene-isoprene copolymer, an acrylate-butadiene rubber, an acrylonitrile-butadiene-styrene rubber, an ethylene-propylene-diene-based polymer, and a partially hydrogenated, epoxidized, or brominated form thereof.

5. The binder composition for a secondary battery of claim 1, wherein the water-soluble polymer of (D) comprises at least one unit selected from the group consisting of a unit derived from a (meth)acrylic acid ester-based monomer, a unit derived from a (meth)acrylamide-based monomer, and a unit derived from an unsaturated carboxylic acid-based monomer and a vinyl acetate monomer.

6. The binder composition for a secondary battery of claim 5, wherein the (meth)acrylic acid ester-based monomer comprises at least one selected from the group consisting of methyl acrylate, ethyl acrylate, propyl acrylate, isopropyl acrylate, n-butyl acrylate, isobutyl acrylate, n-amyl acrylate, isoamyl acrylate, n-ethylhexyl acrylate, 2-ethylhexyl acrylate, 2-hydroxyethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethylhexyl methacrylate, 2-ethylhexyl methacrylate, hydroxyethyl methacrylate, hydroxypropyl methacrylate, methacryloxyethyl ethylene urea, β-carboxyethyl acrylate, aliphatic monoacrylate, dipropylene diacrylate, ditrimethylolpropane tetraacrylate, hydroxyethyl acrylate, dipentaerythritol hexaacrylate, pentaerythritol triacrylate, pentaerythritol tetraacrylate, lauryl acrylate, seryl acrylate, stearyl acrylate, lauryl methacrylate, cetyl methacrylate, and stearyl methacrylate.

7. The binder composition for a secondary battery of claim 5, wherein the (meth)acrylamide-based monomer comprises at least one selected from the group consisting of acrylamide, n-methylol acrylamide, n-butoxymethyl acrylamide, methacrylamide, n-methylol methacrylamide, and n-butoxymethyl methacrylamide.

8. The binder composition for a secondary battery of claim 5, wherein the unsaturated carboxylic acid-based monomer comprises at least one selected from the group consisting of maleic acid, fumaric acid, methacrylic acid, acrylic acid, glutaric acid, itaconic acid, tetrahydrophthalic acid, crotonic acid, isocrotonic acid, and nadic acid.

9. The binder composition for a secondary battery of claim 1, wherein the water-soluble polymer of (D) comprises at least one selected from the group consisting of polyvinyl alcohol (PVA), polyacrylic acid (PAA), and polyacrylamide (PAM).

10. A negative electrode for a lithium secondary battery, comprising:
   a silicon-based negative electrode active material; and
   the binder composition for a secondary battery of claim 1.

11. The negative electrode for a lithium secondary battery of claim 10, further comprising a carbon-based negative electrode active material,
   wherein the silicon-based negative electrode active material is included in an amount of 1 wt % to 30 wt % in a total negative electrode active material.

12. A lithium secondary battery, comprising the negative electrode for a lithium secondary battery of claim 10.

* * * * *